(12) United States Patent
Baer (10) Patent No.: US 10,462,207 B2
(45) Date of Patent: Oct. 29, 2019

(54) PROVISION OF INFORMATION REGARDING AT LEAST ONE COMMUNICATION TYPE

(71) Applicant: Telia Company AB, Solna (SE)

(72) Inventor: Anders Baer, Arsta (SE)

(73) Assignee: TELIA COMPANY AB, Solna (SE)

( * ) Notice: Subject to any disclaimer, the term of this patent is extended or adjusted under 35 U.S.C. 154(b) by 128 days.

(21) Appl. No.: 15/685,403

(22) Filed: Aug. 24, 2017

(65) Prior Publication Data
US 2018/0063224 A1    Mar. 1, 2018

(30) Foreign Application Priority Data

Aug. 24, 2016 (EP) ..................................... 16185417

(51) Int. Cl.
| | |
|---|---|
| H04L 29/06 | (2006.01) |
| H04L 29/08 | (2006.01) |
| H04W 88/18 | (2009.01) |
| H04M 15/00 | (2006.01) |
| H04L 12/14 | (2006.01) |

(52) U.S. Cl.
CPC .......... *H04L 67/04* (2013.01); *H04L 12/1421* (2013.01); *H04L 12/1492* (2013.01); *H04L 65/00* (2013.01); *H04L 67/06* (2013.01); *H04L 67/28* (2013.01); *H04M 15/41* (2013.01); *H04M 15/44* (2013.01); *H04M 15/8044* (2013.01); *H04M 15/8055* (2013.01); *H04M 15/8061* (2013.01); *H04M 15/83* (2013.01); *H04M 15/8351* (2013.01); *H04M 15/84* (2013.01); *H04M 15/85* (2013.01);
(Continued)

(58) Field of Classification Search
None
See application file for complete search history.

(56) References Cited

U.S. PATENT DOCUMENTS

| | | | | |
|---|---|---|---|---|
| 2010/0184440 | A1* | 7/2010 | Mao ...................... | H04W 48/18 455/437 |
| 2011/0314374 | A1* | 12/2011 | Chae .................. | H04M 1/72522 715/702 |

(Continued)

FOREIGN PATENT DOCUMENTS

| | | |
|---|---|---|
| EP | 2 518 937 A2 | 10/2012 |
| WO | 2015/058368 A1 | 4/2015 |

OTHER PUBLICATIONS

EP Search Report, dated Feb. 22, 2017, from corresponding EP 16185417 application.

*Primary Examiner* — Philip J Chea
*Assistant Examiner* — Hassan A Khan
(74) *Attorney, Agent, or Firm* — Young & Thompson (57) ABSTRACT

The invention relates to a method for providing information on at least one communication type for a communication service to a user terminal wherein a request of a communication service with a subscriber information is received; a first inquiry to an application server is generated; a second inquiry to a register is generated; at least one communication type meeting criterion is determined; a data record for providing information on the determined at least one communication type is generated and transmitted to the user terminal requesting the communication service. The invention also relates to a network node implementing the method and a computer program product.

14 Claims, 4 Drawing Sheets

(52) U.S. Cl.
CPC ....... *H04M 15/851* (2013.01); *H04L 67/1097* (2013.01); *H04W 88/18* (2013.01)

(56) References Cited

U.S. PATENT DOCUMENTS

| | | | | |
|---|---|---|---|---|
| 2012/0203824 A1* | 8/2012 | Oommen | ............ | H04L 41/0809 709/203 |
| 2013/0023230 A9* | 1/2013 | Momtahan | .............. | H04L 12/14 455/405 |
| 2014/0066005 A1* | 3/2014 | Chang | .................... | H04W 4/24 455/406 |
| 2014/0199962 A1* | 7/2014 | Mohammed | .......... | H04M 15/70 455/406 |
| 2017/0078861 A1* | 3/2017 | McNamee | .......... | H04L 12/1407 |

* cited by examiner

PROVISION OF INFORMATION REGARDING AT LEAST ONE COMMUNICATION TYPE

TECHNICAL FIELD

The invention concerns in general the technical field of telecommunications. More particularly, the invention concerns provision of information regarding a communication type.

BACKGROUND OF THE INVENTION

Today's telecommunication systems provide a plurality of ways to establish a communication connection between parties. For example, it is possible to set up a voice call service with a mobile device in a multiple ways due to a plurality of wireless communication technologies available for mobile devices. The traditional mobile communication networks provide at least so called circuit-switched data connection for setting up a call connection over it. In addition, the sophisticated mobile communication networks offer so called data connection over which the mobile devices may connect to data networks, such as Internet, in order to use IP (Internet Protocol) based communication services. The data connection over IP enables the users of the mobile devices to use applications for different purposes, such as for call setup.

However, the complexity of different connection types and pricing of those are difficult to understand by users of the mobile devices. Especially in a situation in which the user, i.e. the subscriber, of the mobile device is not residing in a service area of his/her home network, but as a roaming subscriber served by a foreign mobile communication network, e.g. abroad, an understanding of a connection type and pricing of the connection becomes very challenging for user.

It is also known that today's mobile devices are capable of utilizing so called short range wireless networks, such as Wi-Fi. The Wi-Fi service may also enable access to data network and, thus, to allow utilization of such applications which are configured to utilize packet data access e.g. over IP. There are free Wi-Fis available, but the subscriber's telecom operator may also provide either alone or through a partner network the Wi-Fi connection in variety of locations against a fee included in the subscription, for example. However, the pricing is not always perceivable by the user of the mobile device representing the subscription.

Thus, due to the challenges in the perception of information by the user as regards to communication services there is need to improve the situation with new technical solutions.

SUMMARY OF THE INVENTION

The following presents a simplified summary in order to provide basic understanding of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

An objective of the invention is to present a method, a network node and a computer program product for improving a user awareness of at least one aspect with respect to a communication service. Another objective of the invention is that the method, the network node and the computer program combine information in a sophisticated manner from separate entities for improving the user awareness with respect to the communication service.

The objectives of the invention are reached by a method, an apparatus and a computer program as defined by the respective independent claims.

According to a first aspect, a method for providing information on at least one communication type for a communication service to a user terminal is provided, the method comprising: receiving a request of a communication service with a subscriber information from a user terminal; generating a first inquiry to an application server providing at least part of the communication service for inquiring at least charging data relating to the requested communication service, the application server is selected at least partly on a basis of the requested communication service; generating a second inquiry to a register for obtaining information of available communication types for a subscription defined by the subscriber information and charging data with respect to each of the communication type available for the subscription; determining at least one communication type among the available communication types for the subscription which fulfill at least one communication type related criterion for implementing the requested communication service; generating a data record for providing information on the determined at least one communication type among the available communication types for the subscription which fulfill the at least one communication type related criterion for implementing the requested communication service, the generation of the data record comprising a generation of charging data for each of the determined at least one communication type by combining the charging data received from the application server and the charging data of the at least one communication type received from the register; transmitting the generated data record to the user terminal.

The at least one communication type related criterion for implementing the requested communication service may be received at least from one of the following: the user terminal, the application server. The at least one communication type related criterion from the user terminal, in turn, may be received prior to the receipt of the request of the communication service. Further, the at least one communication type related criterion may be received from the application server in response to the first inquiry.

The second inquiry to the register may be generated through the application server.

Moreover, the request for communication service may comprise an indicator indicating a change in a communication environment experienced by the user terminal, and in response to the receipt of the indicator a network node may be caused to perform: re-generating a first inquiry to an application server providing at least part of the communication service for inquiring at least charging data relating to the requested communication service, the application server is selected at least partly on a basis of the requested communication service; re-generating a second inquiry to a register for obtaining information of available communication types for the subscription and charging data with respect to each of the communication type available for the subscription; re-determining at least one communication type among the available communication types for the subscription which fulfill at least one communication type related criterion for implementing the requested communication service; re-generating a data record for providing information on the re-determined at least one communication type among the available communication types for the subscription which fulfill the at least one communication type related criterion for implementing the requested communication service, the re-generation of the data record comprising a generation of charging data for each of the re-determined at least one communication type by combining the charging data received from the application server and the charging data of the at least one communication type received from the register; re-transmitting the re-generated data record to the user terminal.

According to a second aspect, a network node is provided the network node comprising: at least one processor; at least one memory including computer program code; wherein the at least one memory and the computer program code configured to, with the at least one processor, cause the network node to perform: receive a request of a communication service with a subscriber information from a user terminal; generate a first inquiry to an application server providing at least part of the communication service for inquiring at least charging data relating to the requested communication service, the application server is selected at least partly on a basis of the requested communication service; generate a second inquiry to a register for obtaining information of available communication types for a subscription defined by the subscriber information and charging data with respect to each of the communication type available for the subscription; determine at least one communication type among the available communication types for the subscription which fulfill at least one communication type related criterion for implementing the requested communication service; generate a data record for providing information on the determined at least one communication type among the available communication types for the subscription which fulfill the at least one communication type related criterion for implementing the requested communication service, the generation of the data record comprising a generation of charging data for each of the determined at least one communication type by combining the charging data received from the application server and the charging data of the at least one communication type received from the register; transmit the generated data record to the user terminal.

The network node may be configured to receive the at least one communication type related criterion for implementing the requested communication service at least from one of the following: the user terminal, the application server. Moreover, the network node may be configured to receive the at least one communication type related criterion from the user terminal prior to the receipt of the request of the communication service. Further, the network node may be configured to receive the at least one communication type related criterion from the application server in response to the first inquiry.

The network node may be configured to generate the second inquiry to the register through the at least one application server by instructing the at least one application server to perform the second inquiry.

Moreover, the network node may be configured to perform at least part of functionalities of the at least one application server.

Further, the network node may be configured to receive, in the request for communication service, an indicator indicating a change in a communication environment experienced by the user terminal, and wherein the network node may further be caused to perform in response to the receipt of the indicator: re-generate a first inquiry to an application server providing at least part of the communication service for inquiring at least charging data relating to the requested communication service, the application server is selected at least partly on a basis of the requested communication service; re-generate a second inquiry to a register for obtaining information of available communication types for the subscription and charging data with respect to each of the communication type available for the subscription; re-determine at least one communication type among the available communication types for the subscription which fulfill at least one communication type related criterion for implementing the requested communication service; re-generate a data record for providing information on the re-determined at least one communication type among the available communication types for the subscription which fulfill the at least one communication type related criterion for implementing the requested communication service, the re-generation of the data record comprising a generation of charging data for each of the re-determined at least one communication type by combining the charging data received from the application server and the charging data of the at least one communication type received from the register; re-transmit the re-generated data record to the user terminal.

According to a third aspect, a computer program product is provided, the computer program product comprising at least one computer-readable storage medium having computer-executable program code instructions stored therein for performing the method according to the first aspect above when the computer program product is executed on a computer.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

The present invention relates to a solution for providing information on at least one communication type for a communication service to a user terminal. With the term communication type is herein referred to a technology by means of which a communication service may be implemented. Thus, the communication type may refer to an access technology by means of which the user terminal access to a certain service or any alternative communication type within a certain access technology, such as circuit-switched or packet-switched technology or messaging over signaling or data connection and so on. The communication service refers to an application by means of which the user terminal may communication with another entity communicatively coupled to the user entity over one or more networks.

Figure 1:
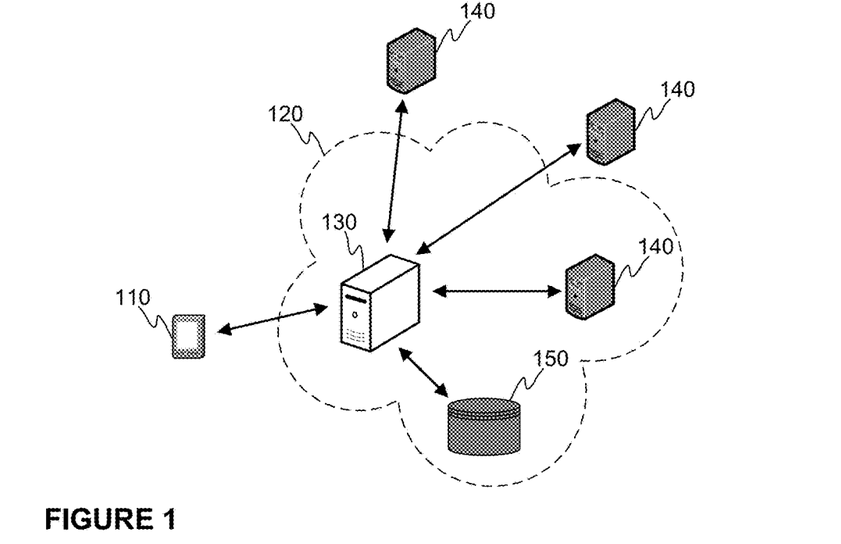
FIG. 1 illustrates schematically an example of a communication environment of the invention.

The solution according to the present invention may be implemented in a communication environment as schematically illustrated in FIG. 1. The communication environment may comprise one or more user terminals 110 configured to communicate with another entity through one or more communication networks 120. The user terminal 110 may be configured to implement at least one access technology and, thus, at least one communication type, and thus to be communicatively coupled to a network over the at least one communication type. The user terminal 110 is arranged to be communicatively coupled to a network node 130 over a communication network 120 in question. In FIG. 1 it is not disclosed network elements belonging to the communication network 120 and needed for arranging the communicative coupling to the network node 130. However, these network elements may be comprise typical network elements of a mobile communication network belonging to a core network and a radio access network. Some non-limiting examples of these network elements base station, base station controllers, mobile switching centers, registers and so on. Furthermore, the network node 130 is communicatively coupled to one or more application servers 140 and at least one register 150 maintaining necessary data for implementing the present invention, as will be explained. The application servers 140 refer to network elements which are configured to implement one or more communication service and in that manner to provide the service to users of the user terminals 110. The application servers 140 may reside inside the communication network 120 or external to that in such a manner that interworking between the user terminal 110 and the application server is arranged through the communication network 120. Typical, but non-limiting, examples of the communication services implemented by the application servers 140 may be different kinds of messaging services and social media services, which connect users over the service in question.

As mentioned users of the user terminals 110 are exploiting a variety of the communication services wherein the exploited communication service may be provided with a plurality of communication types available for the user. However, the users are not aware if a certain communication service may be provided in a preferable manner to the user in question with one communication type than another. An example of the preference is typically a price for using the communication service. This is especially true when traveling abroad and the subscription is managed as a roaming subscriber in the visited network in which a use of certain communication service with some communication type may cause additional and/or unexpected costs to the user without he/she understands it. Thus, the present invention may be implemented by configuring the network node 130 to provide user terminal 110 information on at least one communication type available for the communication service requested by the user of the user terminal 110.

The present invention is now described in the following by referring to FIG. 2, which depicts an example of the method according to the invention.

Step 210:

The network node 130 receives a request of a communication service 210 from the user terminal 110. The request comprises an indication of the communication service the user is willing to use together with subscriber information. The subscriber information refers to an identifier by means of which the subscriber may be identified in the communication network 120 either directly or indirectly. The indirect identification may e.g. refer to a situation in which some entity is configured to determine the subscriber identity in the communication network 120 with some other identifier carried in the request and delivered to the entity in question. A non-limiting example of the subscriber information may e.g. be MSISDN which is a number uniquely identifying the subscription in GSM or UMTS network. Another example of the subscriber information delivered in the request may be so called IMSI (International Mobile Subscriber Identity). The mentioned pieces of information in the request may also be transmitted to the network node 130 with separate messages wherein the network node is configured to determine that the received plurality of messages relate to the same request. This may be achieved e.g. be including some kind of common identifier to each of the messages belonging to the same request.

The communication between the user terminal 110 and the network node 130 may be arranged by using some known communication protocol, such as session initiation protocol (SIP) especially in a context of multimedia communication request.

As said the subscriber information is some kind of subscriber specific piece of information by means of which the subscriber may be identified in the network side. As a non-limiting example the subscriber identifier may be obtained from a subscription residing in the user terminal in a form of subscriber identity module, as is commonly known in the area of mobile telecommunications.

Step 220:

In response to the receipt of the request 210 the network node 130 is configured to generate a first inquiry 220 to at least one application server 140 providing at least part of the communication service requested by the user. The application server 140 needs at least to store at least charging data with respect to the communication service. The first inquiry may be delivered with any signaling channel between the mentioned entities, such as TCP/IP protocol or any other protocol by means of which a communication between the entities may be implemented with. The first inquiry to the at least application server 140 providing the at least part of the communication service requested by the user is generated for inquiring at least charging data relating to the requested communication service. In response to the first inquiry the network node 130 receives charging data relating to the requested communication service. The charging data may e.g. comprise, but is not limited to, charging information on the provision of the service with at least one communication type. In an advantageous embodiment of the invention the application server 140 maintains charging data for a plurality of communication types for providing the requested communication service. Thus, the response to the first inquiry may indicate which communication types are possible to use when providing the requested communication service. The indication may be derived from the charging data information i.e. only those communication types may be used in the context of the requested service, which are providing with the charging data.

According to some embodiment of the invention the first inquiry may be generated for inquiring at least one communication type related criterion for implementing the requested service in addition to the inquiry of the charging data. The at least one communication type related criterion may refer to at least one requirement the communication service sets for communication types in order to use the service in question. This kind of requirement may be some sort of technical requirement, such as a bandwidth or latency, for example.

Step 230:

In response to the receipt of the request 210 the network node is configured to generate a second inquiry 230 to at least one register 150 for obtaining information of available communication types for the subscriber and charging data with respect to each of the communication type available for the subscription. The second inquiry may advantageously be performed over any communication channel with necessary signaling over it. The second inquiry advantageously carries the subscriber information received in the request 210 in order to perform the inquiry to the register 150 with the subscriber information. This is especially needed when the register 150 resides in the communication network and is a telecom operator owned entity which maintains and stores information on the existing subscriptions in the communication network. For example, the register 150 may be HLR or VLR and the subscription information by means of which the inquiry is performed is IMSI. In response to the second inquiry 230 the registers may respond by providing information on the communication types available for the subscription together with charging data with respect to each of the available communication types.

According to some embodiment of the invention the generation of the second inquiry 230 may be arranged to be dependent on the status of the first inquiry. For example, both inquiries may be arranged to be performed at least partly in parallel or they may be arranged to be consecutive in any order even if it may be concluded from FIG. 2 that they are consecutive to each other.

Figure 3A:
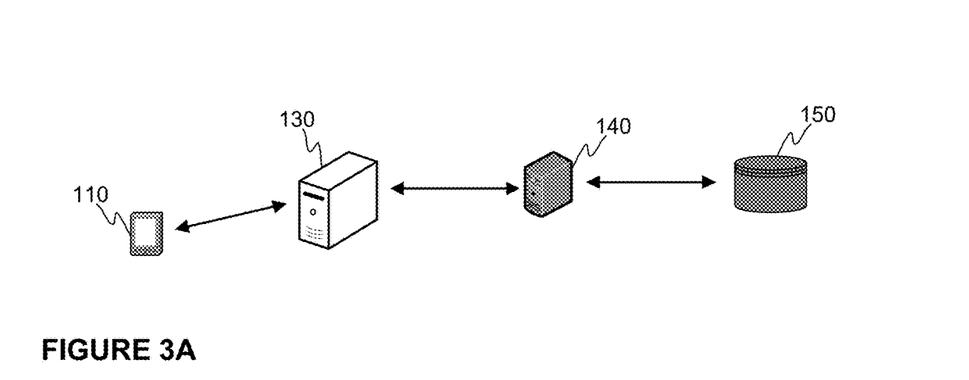
FIGS. 3A and 3B illustrate schematically examples of an implementation of the invention according to some embodiments.

In the previous description the network node 130 is configured to perform the described operations towards the one or more application servers 140 and towards the one or more registers 150. However, the present invention may also be implemented so that the network node 130 receives the request with the mentioned pieces of information from the user terminal 110 and, by determining from the request a correct application service 140, instructs at least one application server 140 to perform the inquiry to the register 150, or registers, with the subscriber information received in the request. Such an implementation is schematically illustrated in FIG. 3A. The instruction to perform the inquiry to the register 150 may be delivered together the first inquiry or in a separate signaling. In this kind of embodiment the application server 140 is granted an access to the register 150, especially if the application server 140 and the register 150 are not managed by the same party, such as telecom operator. The grant of access may be implemented with any known access technology, such as providing secure connections wherein the access itself may require access credentials.

Figure 3B:
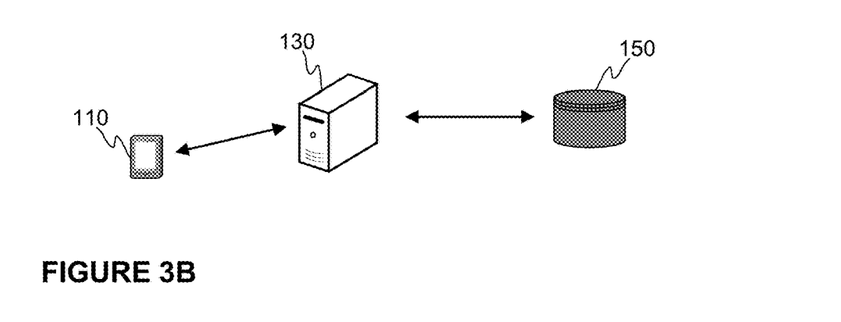

As described, the network node 130 and the application server 140 may be implemented as separate entities. Moreover, all the described functionalities of the network node 130 and the application server 140 may be implemented in the same network node 130, as shown in FIG. 3B. This is especially advantageous in a situation in which both the network node 130 and the application server 140 are managed and controlled by the same party, such as a telecom operator. The network node 130 implementing also the function of the application server is configured to communicate with the register as described.

Figure 2:
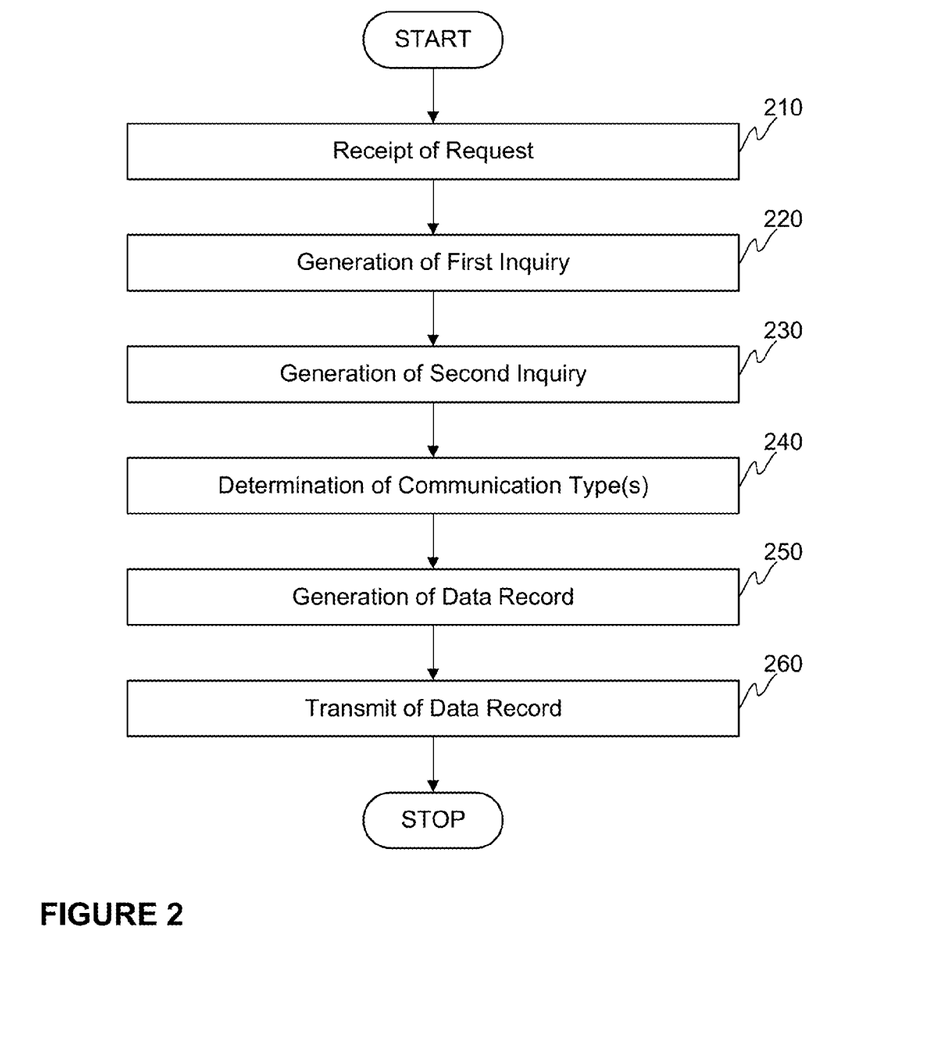
FIG. 2 illustrates schematically an example of the method according to the invention.

Now, the description of the embodiment of the solution according to the present invention as illustrated in FIG. 2 is continued by describing the solution from the step 240 onwards, wherein the network node 130 is received the requested information for the first and the second inquiries. Herein the invention is described in such an implementation of the invention in which the network node 130 is communicatively coupled to the at least one application server 140 and the at least one register 150. However, the description of the invention is also applicable in the implementation of the present invention as illustrated in FIG. 3 or in the implementation in which the network node 130 and the application server 140 are the same entity.

Step 240:

Further, the network node 130 is configured to determine 240 at least one communication type among the available communication types for the subscription which fulfill the at least one communication type related criterion for implementing the requested communication service. The communication type related criterion may refer to some requirement that is either stored in the network node 130 or delivered to the network node 130 from any entity, such as from an application server 140 as discussed in the context of step 220. In some implementations the criterion, or at least part of it, may be user settable criterion or criteria, which means that the user of the user terminal may set one or more criteria to the communication type which he/she requires in a context of one or more communication services he/she uses, which is transferred and stored in the network node 130. These criteria together with any other criterion or criteria may be used in the determination step 240. The determination itself may e.g. be arranged so that at least one piece of information obtained through the second inquiry for the subscription residing in the user terminal is compared to criterion defined for the at least communication type in question for using the requested communication service, and if the obtained piece of information with respect to the at least one communication service fulfills the criterion the network node 130 is configured to decide that the at least one communication type available for the subscriber is applicable for implementing the requested service. In case the subscription is entitled to use a plurality of communication types fulfilling the corresponding criterion defined for each communication type, the outcome may be a plurality of communication types available for the subscriber that fulfills predetermined criterion or criteria.

Step 250:

The network node 130 is now aware of such communication types which are available for providing the requested service to the user terminal 110 and charging data with respect to the communication service and also with respect to the communication types available for the subscription residing in the user terminal. In response to a receipt of all the information the network node is configured to generate a data record 250 for providing information on the determined at least one communication type among the available communication types for the subscription which fulfill the at least one communication type related criterion for implementing the requested communication service. According to an embodiment of the invention the generation comprises at least a generation of charging data for each of the determined at least one communication type by combining the charging data received from the application server and the charging data of the at least one communication type received from the register. The combining may e.g. refer to summing the mentioned pieces of charging data together if they are commensurable as such. Alternatively or in addition, the network node 130 may be configured to modify the received information so that they are commensurable for generating the data record.

Step 260:

In response to the generation of the data record the network node 130 is configured to transmit the data record 260 with the described pieces of information to the user terminal 110, which requested the information. The transmit may be arranged to be performed through the same communication channel as the request was received 110. For example, if the request was received over a session initiation protocol the response may be transmit over the same session. However, the communication channel may be any other applicable for the need.

In response to a receipt of the data record in the user terminal 110 the information of the data record may e.g. be provided to the user over any user interface, such as a display. It may be arranged that the user is prompted to select the communication type to be used among the ones listed in the data record. In response to the selection the user terminal may be configured to set in such a state that the selection may be executed and thus the communication service is implemented over the selected communication type. Alternatively or in addition, the user may have some predetermined settings in his/her user terminal and by following the settings the user terminal 110 may automatically select, based on the information received from the network node 130 in the data record, a preferable communication type for using the requested service.

Figure 4A:
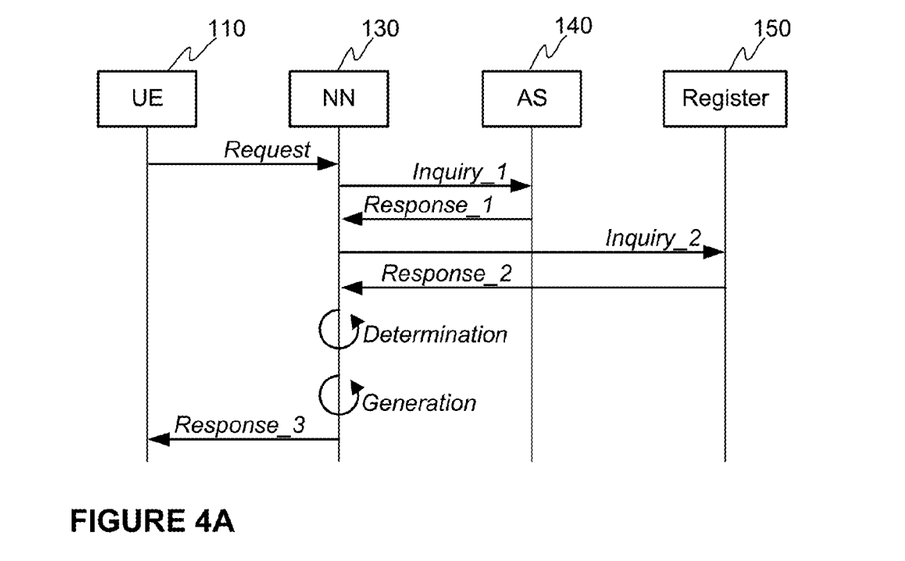
FIGS. 4A-4C illustrates schematically signaling between entities in different embodiments of the invention.
Figure 4B:
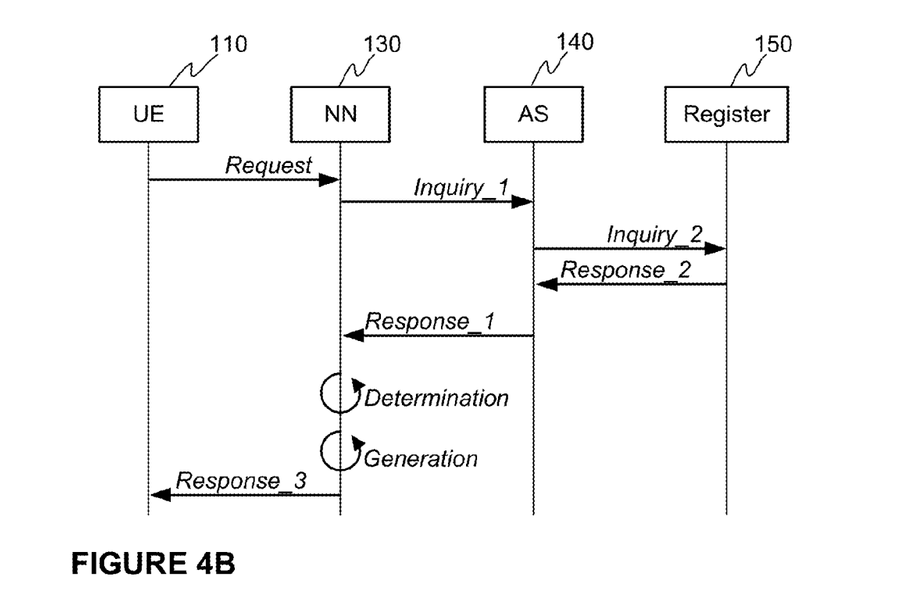
Figure 4C:
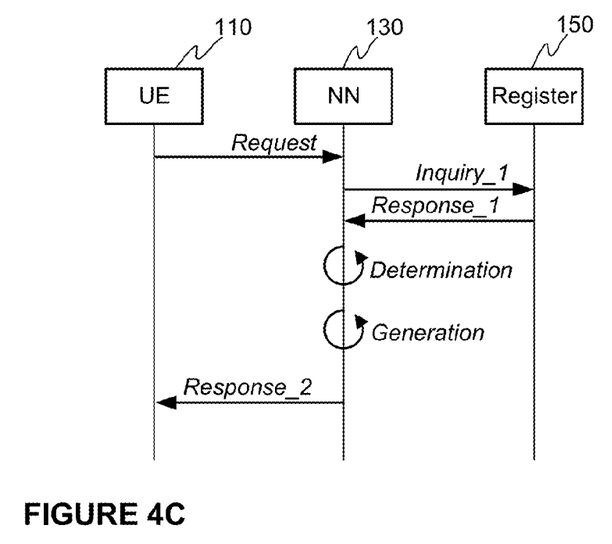

FIGS. 4A-4C illustrate schematically signaling between different entities in the embodiments of the invention as described above. In the following description of FIGS. 4A-4C the references in parentheses refer to used terms in the corresponding figures. In FIG. 4A it is illustrated the embodiment of the invention in which a network node 130 is configured to communicate with application server 140 and a register 150 in order to gather necessary pieces of information in order to provide requested information to the user terminal 110. The provision of information may be initiated in response to a receipt of a request (Request) in the network node 130 from the user terminal 110. The network node 130 may be configured to, in this embodiment, inquire the described pieces of information from an application server 140 and a register 150 (Inquiry_1 and Inquiry_2). The application server 140 and the register 150 may be configured to response to the network node and provide inquired pieces of information to the network node 130 in their response signals (Response_1 and Response_2). The network node 130 may be configured to perform a determination of communication type(s) operation (Determination) and a generation of data record operation (Generation) as described and to transmit the generated data record as a response (Response_3) to the request (Request).

FIG. 4B illustrates schematically the embodiment of the invention in which the network node 130 and the application server 140 are separate entities and wherein the application server is configured to communicate with the register 150. Again the network node 130 may receive the request (Request) and may initiate an inquiry (Inquiry_1) to the application server 140 in order to receive pieces of information as described in the context of the description of the steps 220 and 230 above. In order to do that the application server 140 may be configured to inquire the register 150 (Inquiry_2) and to receive information of available communication types for the subscriber and charging data with respect to each of the communication type available for the subscription in the response (Response_2). The application server 140 may provide the information to the network node 130 in the response (Response_1). In response to the receipt of the response the network node 130 may be configured to determine (Determination) and to generate (Generation) the data record as described and to transmit the generated data record as a response (Response_3) to the request (Request).

FIG. 4C, in turn, illustrates schematically the embodiment of the invention in which the network node 130 is also configured to perform operations of an application server 140 together with the operation of the network node 130 according to the present invention. In such an embodiment the network node 130 may receive the request (Request) and may be configured to initiate an inquiry (Inquiry_1) to the register 150 in order to obtain subscriber-specific information as described. The register 150 may be configured to respond with the information (Response_1) to the network node 130. In response to a receipt of the response the network node 130 may be configured to determine (Determination) applicable communication types(s) with the received information from the register and with the internal information relating to the requested communication service, as the network node 130 operates as the application server at least in part. Moreover, the network node 130 may be configured to generate data record (Generation) with the information as described and transmit a response (Response_2) to the request.

In the description of FIGS. 4A-4C the terminology with respect to the signaling between the entities does not necessarily correspond to each other between the Figures.

In addition to the examples of the present invention disclosed above it may be arranged that the described method is triggered in response to a detection that a communication environment changes at the user terminal and due to this there is need to perform the described method again in order to provide updated information to the user terminal in order to select an optimal communication type for a communication service. For example, as the user terminal 110 may be mobile, i.e. traveling in an area, it may happen that the user terminal transfers from an operational area of a first Wi-Fi to an operational area of a second Wi-Fi. In that case it may happen that the charging information received in response to some request does not apply anymore and updated information is needed. Thus, the user terminal 110 may be configured to monitor the communication environment and to provide at least one indicator representing the communication environment, or any part of it, such as an individual network, to the network node 130. The indicator may be delivered in the request 210 to the network node 130. Further, in some embodiment the user terminal may be configured to monitor the communication environment and in response to a detection that the communication environment has changed to transmit the indicator to the network node 130 as a request of communication service 210. The network node may initiate or re-trigger, in response to a receipt of the indicator, the method steps 220, 230, 240, 250 and 260 as described above in order to provide information on at least one communication type for a communication service to the user terminal 110 in the changed communication environment. Further, the network node 130 may provide the indicator representing the communication environment, or a change therein, to at least one of the following: at least one application server, at least one register for indicating to at least one of the entities new information on the communication environment experienced by the user terminal 110. For example, if the indicator of the communication environment comprises e.g. a network identifier, such as SSID, of the second Wi-Fi as mentioned above, the network node 130 may request charging information also with respect to the second Wi-Fi from either the at least one application server or the at least one register. Any of these entities may provide charging information with respect to the second Wi-Fi together with any other possible information which is finally provided to the user terminal for final selection of the communication type with the updated information. The example of the change in the communication environment is not limited to the above example related to Wi-Fi, but the same fundamental solution may be applied with respect to any other change in the communication environment and/or any change in communication types therein. For example, the network node 130 may be configured to receive the described indicator in every request of the communication service from the user terminal and the network node may be configured to determine any change in the indicator and in that way to detect a need for performing the method according to the invention in order to provide updated information to the user terminal. In such an embodiment of the invention the indicator carries one or more parameters representing the communication environment experienced by the user terminal.

Figure 5:
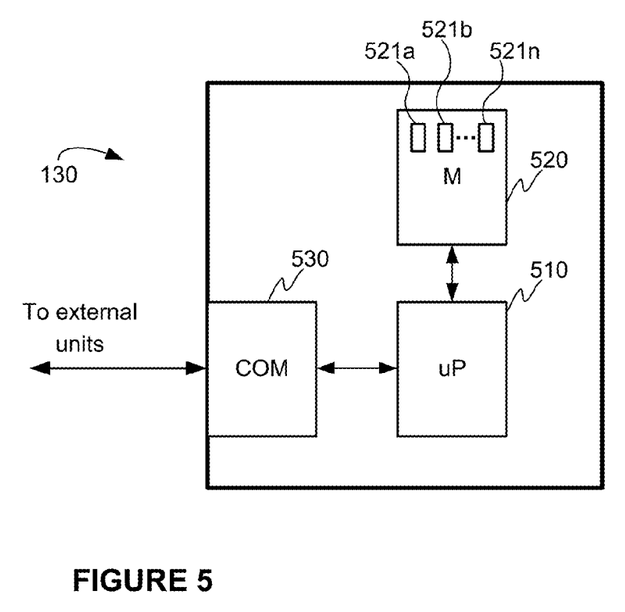
FIG. 5 illustrates schematically a network node according to the invention.

FIG. 5 illustrates schematically a network node 130 according to an example of the invention. The network node 130 is configured, at least partly, to implement the present invention as described. The execution of the present invention may be achieved by arranging a processor 510 to execute at least some portion of computer program code 521a-521n stored in a memory 520 causing the processor 510, and, thus, the network node 520 to implement one or more method steps as described. The processor 510 is thus arranged to access the memory 520 and retrieve and store any information therefrom and thereto. Moreover, the processor 510 is configured to control the communication through a communication interface 530 with any external unit, such as with at least one user terminal 110, at least one application server 140 and/or at least one register 150. In other words, the network node 130 may be communicatively coupled to the user terminals 110 either directly or indirectly e.g. through a mobile communication network or a data network, such as Internet. The processor 510 may also be configured to control overall operability of the network node 130 according to instructions stored in the memory 520 in a form of computer program code and parameters thereto. For sake of clarity, the processor herein refers to any unit suitable for processing information and control the operation of the network node 130, among other tasks. The mentioned operations may e.g. be implemented with a microcontroller solution with embedded software. Similarly, the invention is not limited to a certain type of memory only, but any memory type suitable for storing the described pieces of information may be applied in the context of the present invention. The present invention is described above so that the method is to be implemented in one network node 130. The implementation may also be done in a decentralized manner i.e. between multiple network nodes 130 that are operatively coupled to each other either directly or indirectly.

Some aspects of the present invention may also relate to a non-transitory computer-readable storage medium storing at least portions of computer program code, wherein the portions of computer program code are computer-executable program code instructions to implement the method steps in a network node 130 as described. In general, the computer-readable storage medium may include a storage medium or memory medium, such as magnetic or optical media e.g. disc, DVD/CD-ROM, volatile or non-volatile media, such as RAM. The computer program code may be written in any form of programming language, including compiled or interpreted languages, and the computer program may be deployed in any form, including as a stand-alone program or as a sub-routine, element or other unit suitable for use in a computing environment. A computer program code may be deployed to be executed on one network node or on multiple network nodes, i.e. computer(s), at one site or distributed across multiple sites and interconnected by a communication network. This definition comprises also any solutions based on so called cloud computing. The computer program code comprises instructions for causing the network node to perform one or more of the method steps as described above.

Generally speaking the present invention is especially applicable in a situation when charging information with respect to an application and/or to a subscription changes. Then, it would be advantageous to distribute the changed information to subscribers so that their awareness of incurring costs using the service is updated. In such a case the request of communication service shall be understood to refer to an order of receiving updates if charging information is updated. The order may e.g. be performed by signaling an appropriate message, such as a subscription message under SIP protocol, to the network node 130, or to any other entity taking care of the subscription of updates.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for providing information on at least one communication type for a communication service to a user terminal, the method comprising:
receiving a request of a communication service with a subscriber information from a user terminal;
generating a first inquiry, including information of the communication service, for inquiring at least a first charging data relating to the requested communication service, and transmitting said first inquiry to an application server, the application server selected at least partly on a basis of the requested communication service;
receiving, from the application server, at least the first charging data from the application server;
generating a second inquiry for obtaining information of available communication types available for a subscription, as defined by the subscriber information, and a second charging data with respect to each of the communication types available for the subscription, and transmitting said second inquiry to a register;
receiving, from the register, at least the second charging data of at least one communication type;
determining at least one communication type among the available communication types for the subscription which fulfill at least one communication type related criterion for implementing the requested communication service;

generating a data record for providing information on the determined at least one communication type among the available communication types for the subscription which fulfill the at least one communication type related criterion for implementing the requested communication service, the generation of the data record comprising a generation of charging data for each of the determined at least one communication type, by combining the first charging data received from the application server and the second charging data of the at least one communication type received from the register; and transmitting the generated data record to the user terminal.

2. The method of claim 1, wherein the at least one communication type related criterion for implementing the requested communication service is received at least from one of the following: the user terminal, and the application server.

3. The method of claim 2, wherein the at least one communication type related criterion from the user terminal is received prior to receipt of the request of the communication service.

4. The method of claim 2, wherein the at least one communication type related criterion is received from the application server in response to the first inquiry.

5. The method of claim 1, wherein the second inquiry to the register is generated through the application server.

6. The method of claim 1,
wherein the request for communication service comprises an indicator indicating a change in a communication environment experienced by the user terminal, and
wherein, in response to the receipt of the indicator, a network node is caused to perform:
re-generating the first inquiry including information of the communication service, for inquiring at least a third charging data relating to the requested communication service, and transmitting said re-generated first inquiry to an application server, the application server selected at least partly on a basis of the requested communication service,
receiving, from the application server, at least the third charging data from the application server,
re-generating the second inquiry for obtaining information of available communication types available for the subscription and a fourth charging data with respect to each of the communication types available for the subscription, and transmitting said re-generated second inquiry to a register;
receiving, from the register, at least the fourth charging data of at least one communication type;
re-determining at least one communication type among the available communication types for the subscription which fulfill at least one communication type related criterion for implementing the requested communication service,
re-generating a data record for providing information on the re-determined at least one communication type among the available communication types for the subscription which fulfill the at least one communication type related criterion for implementing the requested communication service, the re-generation of the data record comprising a generation of updated charging data for each of the re-determined at least one communication type by combining the third charging data received from the application server and the fourth charging data of the at least one communication type received from the register, and re-transmitting the re-generated data record to the user terminal.

7. A network node, comprising:
at least one processor;
at least one memory including computer program code;
the at least one memory and the computer program code configured to, upon execution by the at least one processor, cause the network node to:
receive a request of a communication service with a subscriber information from a user terminal,
generate a first inquiry, server including information of the communication service, for inquiring at least a first charging data relating to the requested communication service, and transmit said first inquiry to an application server, the application server selected at least partly on a basis of the requested communication service,
receive, from the application server, at least the first charging data from the application server,
generate a second inquiry for obtaining information of available communication types available for a subscription, as defined by the subscriber information, and a second charging data with respect to each of the communication types available for the subscription, and transmit said second inquiry to a register,
receive, from the register, at least the second charging data of at least one communication type,
determine at least one communication type among the available communication types for the subscription which fulfill at least one communication type related criterion for implementing the requested communication service,
generate a data record for providing information on the determined at least one communication type among the available communication types for the subscription which fulfill the at least one communication type related criterion for implementing the requested communication service, the generation of the data record comprising a generation of charging data for each of the determined at least one communication type, by combining the first charging data received from the application server and the second charging data of the at least one communication type received from the register, and
transmit the generated data record to the user terminal.

8. The network node of claim 7, wherein the network node is configured to receive the at least one communication type related criterion for implementing the requested communication service at least from one of the following: the user terminal, and the application server.

9. The network node of claim 8, wherein the network node is configured to receive the at least one communication type related criterion from the user terminal prior to receipt of the request of the communication service.

10. The network node of claim 8, wherein the network node is configured to receive the at least one communication type related criterion from the application server in response to the first inquiry.

11. The network node of claim 7, wherein the network node is configured to generate the second inquiry to the register through the at least one application server by instructing the at least one application server to perform the second inquiry.

12. The network node of claim 7, wherein the network node is configured to perform at least part of functionalities of the at least one application server.

13. The network node of claim 7,
wherein the network node is configured to receive, in the request for communication service, an indicator indicating a change in a communication environment experienced by the user terminal, and
wherein the network node is further caused to, in response to the receipt of the indicator:
  re-generate the first inquiry including information of the communication service, for inquiring at least a third charging data relating to the requested communication service, and transmitting said re-generated first inquiry to an application server, the application server selected at least partly on a basis of the requested communication service,
  receive, from the application server, at least the third charging data from the application server,
  re-generate the second inquiry for obtaining information of available communication types available for the subscription and a fourth charging data with respect to each of the communication types available for the subscription, and transmit said re-generated second inquiry to a register;
  receive, from the register, at least the fourth charging data of at least one communication type;
  re-determine at least one communication type among the available communication types for the subscription which fulfill at least one communication type related criterion for implementing the requested communication service,
  re-generate a data record for providing information on the re-determined at least one communication type among the available communication types for the subscription which fulfill the at least one communication type related criterion for implementing the requested communication service, the re-generation of the data record comprising a generation of updated charging data for each of the re-determined at least one communication type by combining the third charging data received from the application server and the fourth charging data of the at least one communication type received from the register, and
  re-transmit the re-generated data record to the user terminal.

14. A computer program product, comprising at least one non-transitory computer-readable storage medium having computer-executable program code instructions stored therein that causes a computer to perform the method of claim 1 when the computer program product is executed on the computer.

* * * * *